Jan. 1, 1929.

F. J. KUDRNA, JR., ET AL 1,697,071

AUTOMOBILE IGNITION CONTROL SWITCH

Filed April 6, 1926     3 Sheets-Sheet 1

Inventors
N. Yirkosky
F. J. Kudrna, Jr.
By Clarence A. O'Brien
Attorney

Jan. 1, 1929. 1,697,071
F. J. KUDRNA, JR., ET AL
AUTOMOBILE IGNITION CONTROL SWITCH
Filed April 6, 1926 3 Sheets-Sheet 2

Inventors
N. Yirkosky
F. J. Kudrna, Jr.
By Clarence A. O'Brien
Attorney

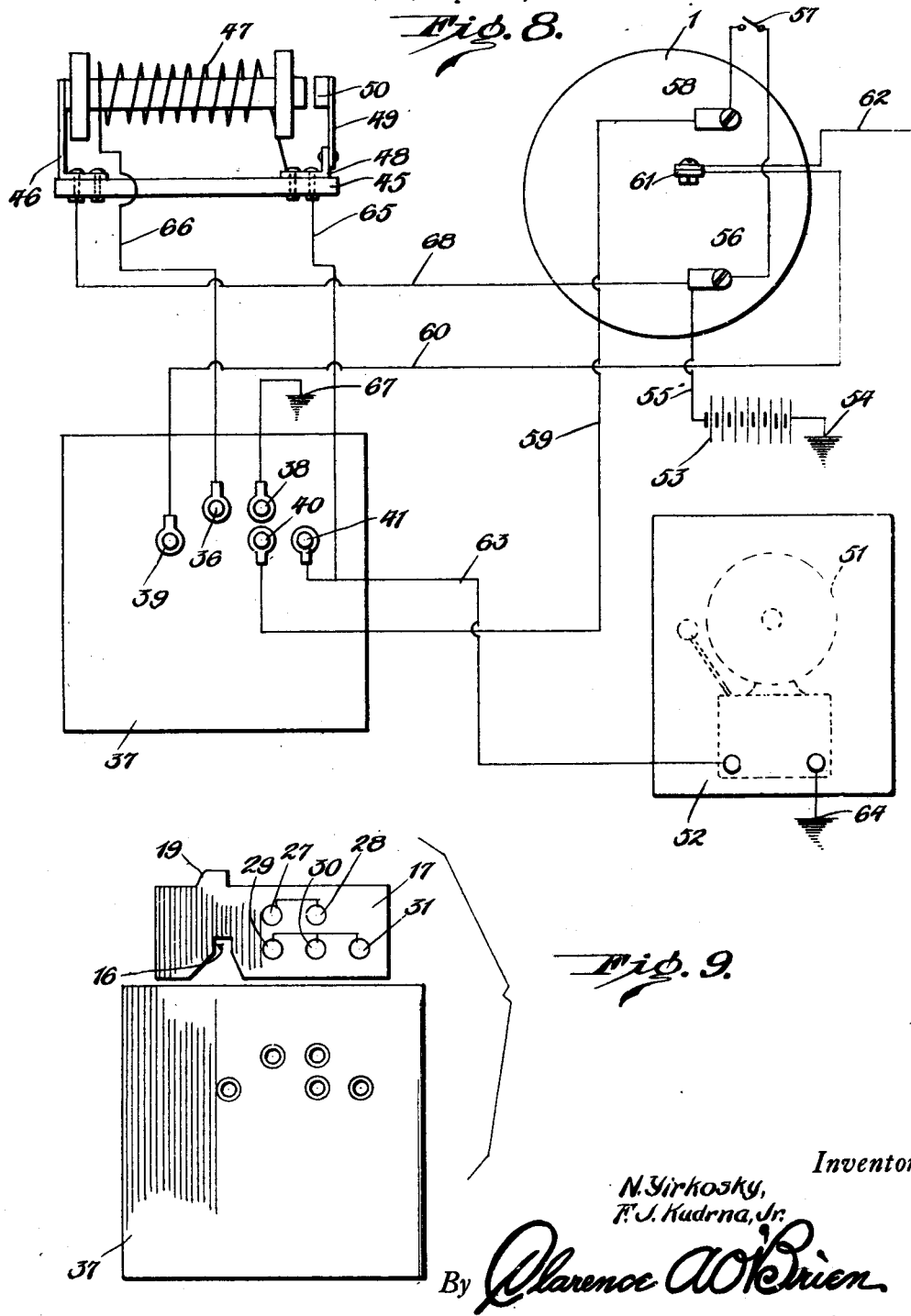

Patented Jan. 1, 1929.

1,697,071

UNITED STATES PATENT OFFICE.

FRANK JOHN KUDRNA, JR., AND NICHOLAS YIRKOSKY, OF CHICAGO, ILLINOIS.

AUTOMOBILE IGNITION-CONTROL SWITCH.

Application filed April 6, 1926. Serial No. 100,101.

This invention relates to a device for providing a lock controlled ignition circuit in combination with a burglar alarm mechanism.

An object of this invention resides in providing a simple and efficient burglar alarm and ignition control construction for automobiles in which all parts of the system are protected by suitable armor to prevent access to the parts unless special tools are used and which will require a considerable amount of time to disassemble the parts and also set in operation and maintain the continuous operation of a suitable alarm mechanism so as to aid in apprehending automobile thieves.

A further object of the invention resides in providing a specially armored lock construction having a tumbler controlled key operated mechanism for operating the circuit controlling and locking members of the improved construction adapted to control the ignition and alarm circuit of the automobile and the invention in a predetermined manner.

The invention further comprehends the provision of a specially designed mounting for housing the various elements of the device in order to provide parts of simple construction which may be readily assembled in unit form providing a structure for carrying out the invention.

Numerous other objects reside in the particular construction and assemblage of parts which are more particularly pointed out in the following detailed description, and in the claims directed to the preferred form of construction, it being understood however, that various changes in the size, shape and arrangement of these parts may be made without departing from the spirit and scope of the invention as herein set forth.

In the drawings forming part of this application:

Fig. 4 is a sectional view taken on line 4—4 of Fig. 2.

Fig. 7 is a detail perspective view of the locking pawl.

Fig. 8 is a diagrammatic view illustrating the wiring connection for the several parts of the device and a portion of the ignition system.

Fig. 9 is a rear elevation of the cover plate for the locking casing showing the position of the openings for the contacts, and an elevation of the movable contact member positioned above the cover plate with the contacts in the relative position that they assume in the locked position of the parts which is illustrated also in Fig. 3.

Figure 1:
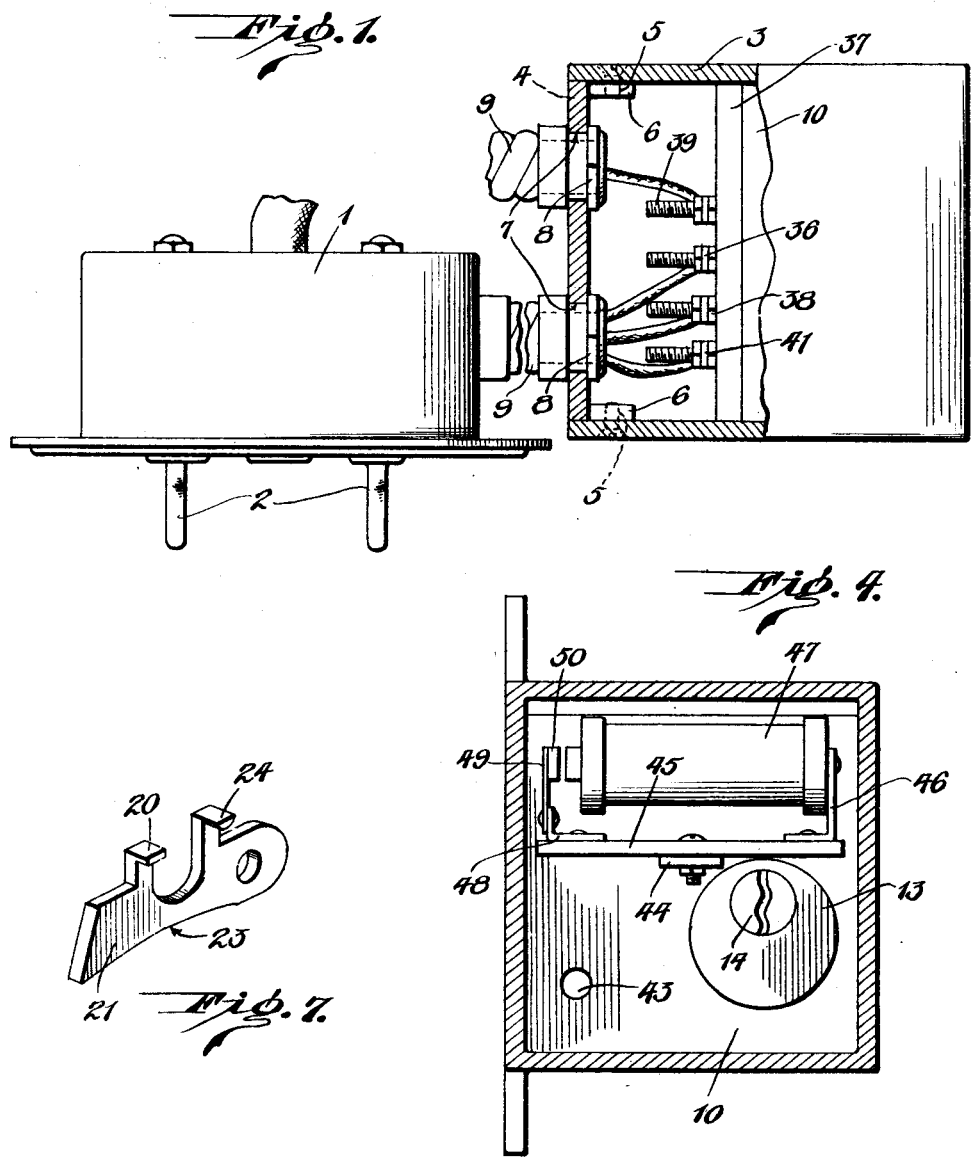
Figure 1 is a plan view of an automobile ignition switch and the main housing for the lock mechanism of this invention showing portions broken away and in section to illustrate the manner of connecting the armored cable therewith.

1 indicates the usual ignition switch of any desired type and construction applied to the instrument board of a motor vehicle, which is provided with the usual circuit control handles 2 for controlling the ignition and light circuits of the automobile.

The present invention is associated with the usual ignition switch of an automobile which controls the circuit in its usual manner, this invention including as its principal element the armor casing 3 and the housed structure. This armored casing 3 has an open rear end which receives the closure plate 4 which is suitably secured in the casing 3 by screws indicated by dotted lines at 5, Fig. 1, which threadedly engage in the ears 6 formed on the closure plate. This closure plate is formed with openings 7 in which are mounted bushings 8 secured on the ends of the armored conduit 9 extending to the parts of the apparatus connected with the casing 3 for protecting the circuits controlled by the lock mechanism in a manner to be described.

One of the cables 9 extends to the ignition switch 1 and is suitably locked in the casing thereof as illustrated in Fig. 1. A suitable lock casing is indicated at 10 the open rear end of which is mounted in the armor casing 3 and suitably retained in position by the screw members 11 extending through the armor casing, and threadedly engaging in the openings 12 in the opposite sides of the lock casing. A tumbler controlled key operated cylinder lock mechanism 13 is mounted on the front wall of the lock casing 10 and has the forward end thereof seated in the opening formed in the forward face of the armor casing so that the cylinder 14 receiving the key projects slightly forward of the front face of the armor casing 3 as shown in Fig. 2.

Figures 2, 3:
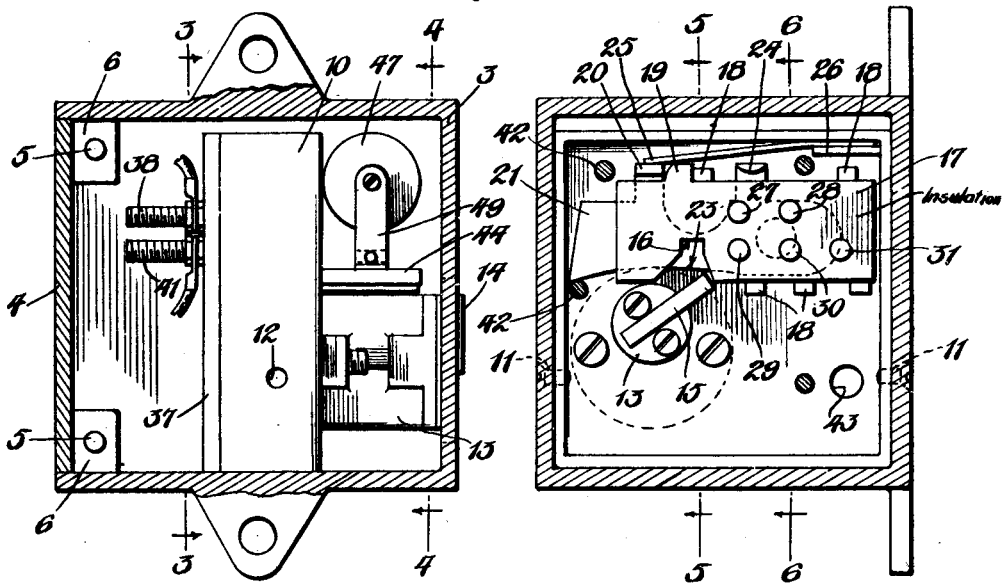
Fig. 2 is a vertical longitudinal sectional view through the armor casing housing the switch and lock mechanism.
Fig. 3 is a view taken on line 3—3 of Fig. 2, with the cover plate of the lock casing removed to show the contacts and locking mechanism in elevation.
Figure 5:
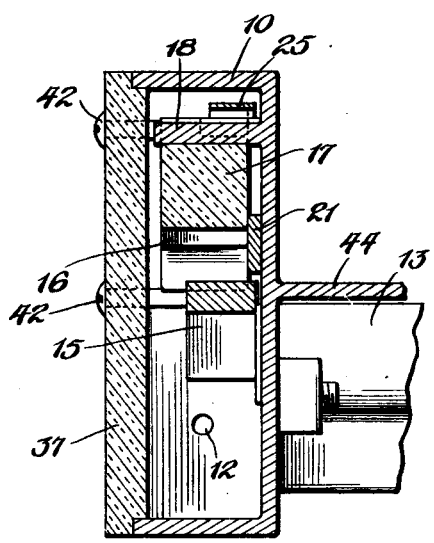
Fig. 5 is a sectional view taken on the line 5—5 of Fig. 3.
Figure 6:
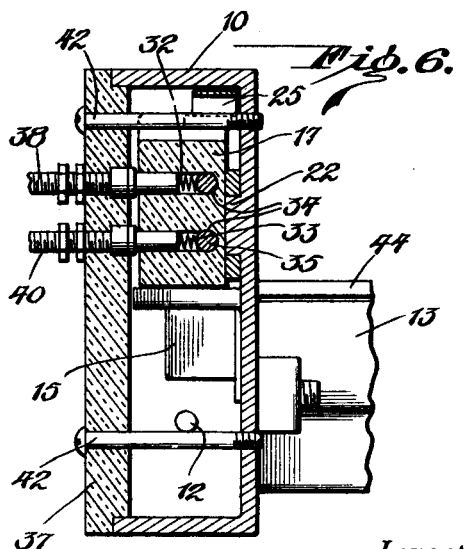
Fig. 6 is a sectional view taken on the line 6—6 of Fig. 3.

The tumbler control key operating mechanism of this cylinder 13 carries the operating finger 15 on the inner or rear end within the lock casing 10 as clearly shown in Figs. 3, 5 and 6. This operating member 15 is adapted to engage in the recess 16 formed in the lower edge of the movable contact member 17 and operates the contact member to control a plurality of circuits in a predetermined manner. This movable contact member is slidably supported on suitable guides 18 formed in the lock casing and on its upper edge toward the left corner as shown in Fig. 3, is formed with a projection 19 adapted to engage one of the lugs as shown in Fig. 3 to limit the movement of the contact member 17 in one direction, while the lateral extension 20 on the latch member 21 engages the opposite side of the lug 19 in the position of the parts as shown in Fig. 3, to prevent the movement of the contact member 17. This latch member 21 is pivotally mounted on the boss 22 between the movable contact member and the front wall of the lock casing as clearly shown in Fig. 6 and has a curved lower edge as indicated at 23 adapted to lie in the path of movement of the operating member 15 for cooperation with said operating member and movement thereby.

A projection is formed at 24 on the upper edge of the latch member 21 extending laterally over the upper edge of the movable contact member 17 and adapted to limit the upward movement of the contact member during its sliding movement. A spring 25 has one end thereof engaged with the projection 20 of the latch member and the opposite end seated in the recess formed by the flange 26 in the upper right hand corner of the lock casing 10 as shown in Fig. 3, and which is adapted to normally move the latch member to its lower position as shown in Fig. 3, for locking the movable contact member 17 at either limit of its movement, at which time the lateral projection 20 is positioned adjacent either side of the projection 19 on the movable contact member 17.

The movable contact member 17 is provided with a plurality of contacts indicated at 27, 28, 29, 30 and 31 respectively which are slidably mounted in bores 32 extending laterally in the body of the member 17 and normally projected by coiled springs 33 within said bores. Longitudinal passages 34 are formed in the movable contact member to receive bar members 35 which are adapted to close the circuit between contacts 27 and 28 respectively and contacts 29, 30 and 31 respectively, as shown diagrammatically in Fig. 9.

The contact 27 is adapted to engage with the stationary contact 36 mounted in the cover plate 37 for the locking casing which is preferably formed of insulating material. This contact member is in the position as shown in Fig. 3, at which time the movable contact 28 will engage with the stationary contact 38 for closing the respective circuits controlled thereby. The contact 29 is adapted to engage with the stationary contact 39 when the movable contact member is at its opposite limit of movement from that shown in Fig. 3, while in the position shown in Fig. 3, the contacts 30 and 31 will engage with the stationary contacts 40 and 41 and close the circuits controlled thereby. In this position as shown in Fig. 3, the contact 29 will not engage any of the stationary contacts on the insulating cover plate 37 and will not make circuit with the contact 39.

At the opposite limit of movement of the movable contact member 17, the contacts 27 and 28 respectively will be moved relative to the stationary contacts 36 and 38 so that the contact 28 will engage contact 36 and the circuit between the two stationary contacts 36 and 38 will be broken and no other circuit made thereby. In this position of the movable contact member, contacts 31 and 29 will engage contacts 39 and 40 respectively and through their linkable connection as shown in Fig. 9 will close the circuit between these two stationary contacts for a purpose which will presently appear.

The cover plate 37 is removably secured to the lock casing 10 through suitable screws 42, screw threaded in openings in the front walls of the lock casing, while the forward portion of the lock casing is formed with an opening at 43 to provide an electric cable passage into the casing.

The forward face of the lock casing 10 is formed with a forwardly extending flange 44 forming a support for the insulating face 45 on one end of which is secured the brackets 46 carrying the relay solenoid 47. A bracket 48 has a spring strip 49 secured thereto and which is positioned at the opposite end of the base 45 and provided with an armature 50 adjacent the ends of the relay solenoid 47 for operation upon energization of said solenoid.

An armored gong or bell 51 adapted for electrical operation is mounted within a suitable armored casing 52 of any desired character to conceal and house the bell which is adapted for mounting in a convenient location on an automobile so that it will not be readily accessible and to which the cable 9 from the armored casing 3 is connected.

The casing 3 is suitably installed on an automobile convenient to the driver's seat so that the key may be inserted in the tumbler controlled cylinder 14 to permit the operation of the movable contact member 17, and the armored cables 9 as shown in Fig. 1, are connected to the casing of the usual ignition and light controlling switch 1 and to the armored casing 52 mounting the bell 51. 53 in Fig. 8, represents the battery as used in the automobile, which is usually provided with a ground on the frame as indicated at 54 at one terminal, while the opposite terminal is connected by a wire 55 to the terminal 56 on the ignition and light controlling switch 1.

Through the operation of the contact in this switch 1, indicated diagrammatically at 57, the circuit with the battery from the wire 55 is closed to the terminal 58 which supplies current to the wire 59 extending thru one of the armored cables 9 to the stationary contact 40 on the cover plate 37, and when the contact points 31 and 29 engage with the stationary contacts 39 and 40, the circuit will be closed to the wire 60 extending to the terminal 61 on switch 1 and through the wire 62 to the usual ignition system and apparatus of the automobile, so that it may be energized for the usual operation of said automobile.

In the position of the movable contact member as shown in Fig. 3, the circuit will be made between the stationary contacts 40 and 41 to the wire 63 and the bell 51, which is grounded as indicated at 64 to the frame of the automobile to provide a return circuit to the battery 53 so that upon the operation of the ignition switch as indicated at 57 in the switch mechanism 1 for the unauthorized use of the automobile it will be seen that the circuit to the alarm bell 51 is immediately closed.

A branch lead 65 extends from stationary contact 41 to the bracket 48 to which one end of the relay coil 47 is electrically connected. The opposite end of this relay coil is connected through the wire 66 to the stationary contact 36 and in the position of the movable contact member shown in Fig. 3, the circuit is closed to the stationary contact 38 which is grounded in any suitable manner on the frame to provide a return circuit to the battery 53 as indicated at 67.

The closure of the ignition switch as indicated at 57 will then close this branch circuit through the relay 47 which will energize the relay and draw the armature against the ends thereof and close circuits to the brackets 46 which is electrically connected by the wire 68 to the terminal 56 of the switch mechanism 1 providing a separate circuit with the battery 53 for maintaining the relay solenoid 47 energized even though the switch 57 is moved to open position.

With the parts in the position shown in Fig. 3, it will be seen that the operation of the switch 57 will energize the alarm bell 51 and produce the operation of the same, at the same time energizing relay solenoid 47 which will of its own operation close an independent circuit therethrough with the battery 53 by the engagement of the armature 50 with the end of the relay solenoid and thereby maintain the circuit to the alarm bell 51 closed until the movable contact member 17 is operated through the use of the key and the cylinder mechanism 13 to operate the lever 15 and open the circuit.

The operation of the movable contact member 17 from the position shown in Fig. 3 to its opposite limit of movement will break the above mentioned circuits and make circuit between stationary contacts 39 and 40 so that the authorized operation of the automobile by the closure of the ignition system through closing switch mechanism 1 by operating contact 57 will permit the usual operation of the automobile without closing the circuit through the alarm system or the relay solenoid 47.

From the above description, it should thus be clear that an efficient electrical alarm system and ignition control has been provided for application to motor vehicles encased by suitable armor, to prevent unauthorized persons from readily operating the automobile through closure of the ignition system or access to the parts without considerable difficulty to stop the alarm which operates automatically after initial energization.

Having thus described our invention, what we claim as new is:—

1. An alarm and ignition control for motor vehicles, comprising a casing, a supporting member mounted in the casing, a key operated cylinder mechanism mounted in said supporting member and projecting through an opening in said casing, said cylinder mechanism having an operating arm thereon, a movable circuit closing member mounted for operation on said supporting member, cooperative circuit controlling means carried by the circuit closing member and said supporting member, and latching means for retaining the circuit closing member in two operative positions, said operating arm being adapted to engage the latching means and circuit closing member whereby the operation of said arm will release the latching means and move the circuit closing member into either of its operative positions.

2. An alarm and ignition control for motor vehicles, comprising a supporting member, a movable circuit control member slidably mounted on one side of said supporting member, a latch member pivotally mounted between the control member and the side of said supporting member, said latch member having a locking projection for cooperation with a projection on the control member for locking it in any one of a plurality of predetermined positions, an operating arm rotatable in the supporting member for moving the latch member to release the control member and move said control member in the supporting member, means normally moving said latch member to locking position, and circuit closing means carried by the supporting member and control member for circuit closing cooperation in a predetermined manner.

3. An alarm and ignition control for motor vehicles, comprising a supporting member, a movable circuit control member slidably mounted on one side of said supporting member, latching means carried by the supporting member for cooperation with the circuit control member to lock said member in any one of a plurality of predetermined positions, operating means for releasing the latching means and operating said control member relative to the casing, and circuit closing members carried by the control member and the casing, and including a plurality of contact elements movably mounted in said control member for movement lateral to the plane of movement of said member, contact bars mounted in said control member, and electrically connected with said contact studs in a predetermined manner, and resilient means for normally projecting said contact studs laterally beyond said control member for circuit closing cooperation with contact studs carried by said supporting member.

In testimony whereof we affix our signatures.

FRANK JOHN KUDRNA, Jr.
NICHOLAS YIRKOSKY.